(12) United States Patent
Chu et al.

(10) Patent No.: US 12,547,054 B1
(45) Date of Patent: Feb. 10, 2026

(54) CONFIGURABLE LIGHT SOURCE FOR MACHINE VISION

(71) Applicant: UnitX, Inc., Santa Clara, CA (US)

(72) Inventors: Yen-Chia Chu, San Jose, CA (US); Taylor M. Parker, San Bruno, CA (US); Anirudh Shankar, San Jose, CA (US); Jaideep Singh Chavan, Mountain View, CA (US)

(73) Assignee: UnitX, Inc., Santa Clara, CA (US)

( * ) Notice: Subject to any disclaimer, the term of this patent is extended or adjusted under 35 U.S.C. 154(b) by 0 days.

(21) Appl. No.: 18/891,975

(22) Filed: Sep. 20, 2024

(51) Int. Cl.
| | |
|---|---|
| *G03B 15/06* | (2021.01) |
| *F21V 3/04* | (2018.01) |
| *F21V 23/00* | (2015.01) |
| *F21V 29/74* | (2015.01) |
| *G01N 21/01* | (2006.01) |
| *G03B 15/03* | (2021.01) |

(52) U.S. Cl.
CPC .............. *G03B 15/06* (2013.01); *F21V 3/049* (2013.01); *F21V 23/001* (2013.01); *F21V 29/74* (2015.01); *G01N 21/01* (2013.01); *G03B 15/03* (2013.01)

(58) Field of Classification Search
CPC ...... H05K 1/028; H05K 1/18; H05K 2201/10106; F21V 23/001; F21V 23/00; F21V 3/049; F21V 29/74; G01N 21/01; G01N 2121/0106; G03B 15/03
USPC .................. 362/11, 249.02, 249.06
See application file for complete search history.

(56) References Cited

U.S. PATENT DOCUMENTS

| | | | | |
|---|---|---|---|---|
| 7,152,996 B2 * | 12/2006 | Luk | ........... | H05K 1/189 |
| | | | | 362/240 |
| 7,874,692 B2 * | 1/2011 | Zheng | ........... | F21K 9/65 |
| | | | | 362/373 |
| 8,192,050 B2 * | 6/2012 | Ido | ........... | G01N 21/8806 |
| | | | | 362/249.02 |
| 11,734,812 B2 | 8/2023 | Wang | | |
| 11,763,442 B2 | 9/2023 | Wang | | |
| 12,135,123 B2 | 11/2024 | Wang et al. | | |
| 2006/0180775 A1 | 8/2006 | Paradis | | |
| 2011/0206234 A1 * | 8/2011 | Benderly | ........... | G01N 21/8806 |
| | | | | 362/249.02 |

(Continued)

FOREIGN PATENT DOCUMENTS

| | | |
|---|---|---|
| DE | 102011008474 | 7/2012 |
| DE | 102015114955 | 3/2017 |

(Continued)

*Primary Examiner* — Laura K Tso
(74) *Attorney, Agent, or Firm* — Schwegman Lundberg & Woessner, P.A.

(57) ABSTRACT

A feature inspection lighting system comprises a body including an inner surface, the inner surface having facets defined therein. A PCB substrate formed of a ductile material is mounted to the inner surface of the body. The PCB substrate comprises segments corresponding to the facets of the inner surface of the body. Light emitters are mounted to the PCB substrate. The thermal interface between the segments of the PCB substrate and the facets of the body facilitates heat transfer. A flexible PC electrically connects the PCB substrate to a cable for supplying power to the lighting system. One or more diffusers are provided to achieve the desired illumination of a target object and to seal the interior of the assembly from contaminants.

20 Claims, 18 Drawing Sheets

(56) References Cited

U.S. PATENT DOCUMENTS

| | | | |
|---|---|---|---|
| 2012/0051055 A1* | 3/2012 | Kauffman | F21V 29/74 |
| | | | 362/249.02 |
| 2012/0155088 A1* | 6/2012 | Spaccasassi | F21V 19/02 |
| | | | 362/249.02 |
| 2014/0036511 A1* | 2/2014 | Whitfield | F21L 14/023 |
| | | | 362/311.02 |
| 2016/0309070 A1 | 10/2016 | White | |
| 2020/0051233 A1 | 2/2020 | Etzold et al. | |
| 2021/0150700 A1 | 5/2021 | Wang | |
| 2021/0342688 A1 | 11/2021 | Wang | |
| 2022/0301144 A1 | 9/2022 | Wang | |
| 2022/0301145 A1 | 9/2022 | Wang | |
| 2024/0133536 A1 | 4/2024 | Wang et al. | |

FOREIGN PATENT DOCUMENTS

| | | |
|---|---|---|
| JP | 2008102103 | 5/2008 |
| KR | 20140040511 | 4/2014 |
| WO | 2022128225 | 6/2022 |
| WO | 2024091300 | 5/2024 |

\* cited by examiner

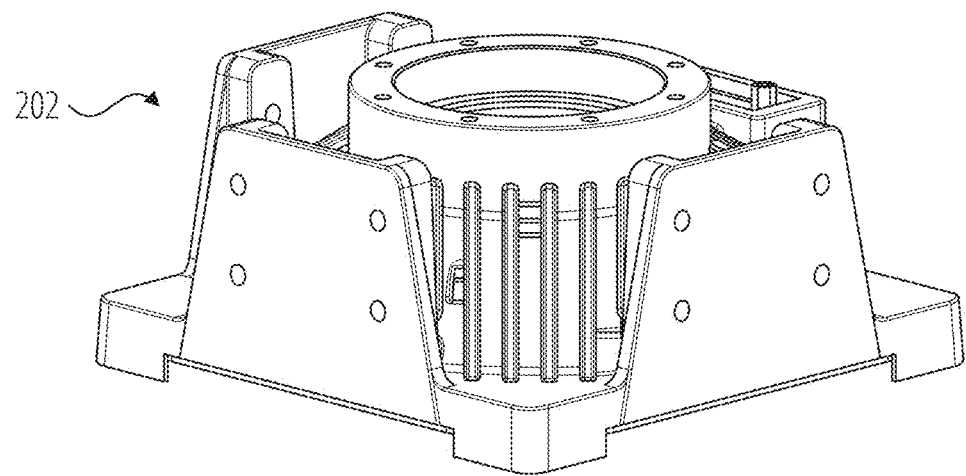
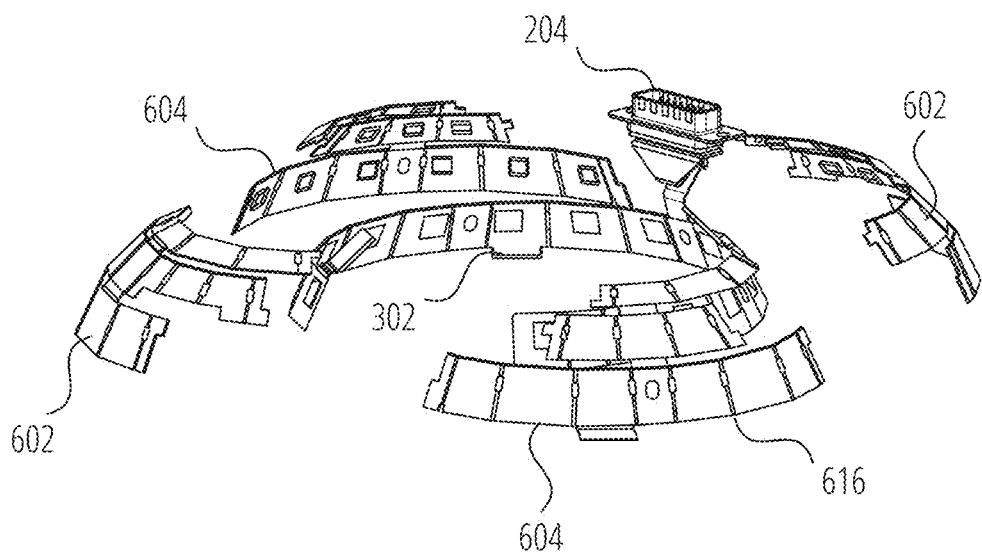
FIG. 7

CONFIGURABLE LIGHT SOURCE FOR MACHINE VISION

FIELD OF THE INVENTION

This application relates to the field of inspection systems and light sources therefor, in some examples.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 is an exploded perspective view of a main body, flex PC, two first metal-based PCBs, and two second metal-based PCBs, according to some examples.

DETAILED DESCRIPTION

Figure 1:
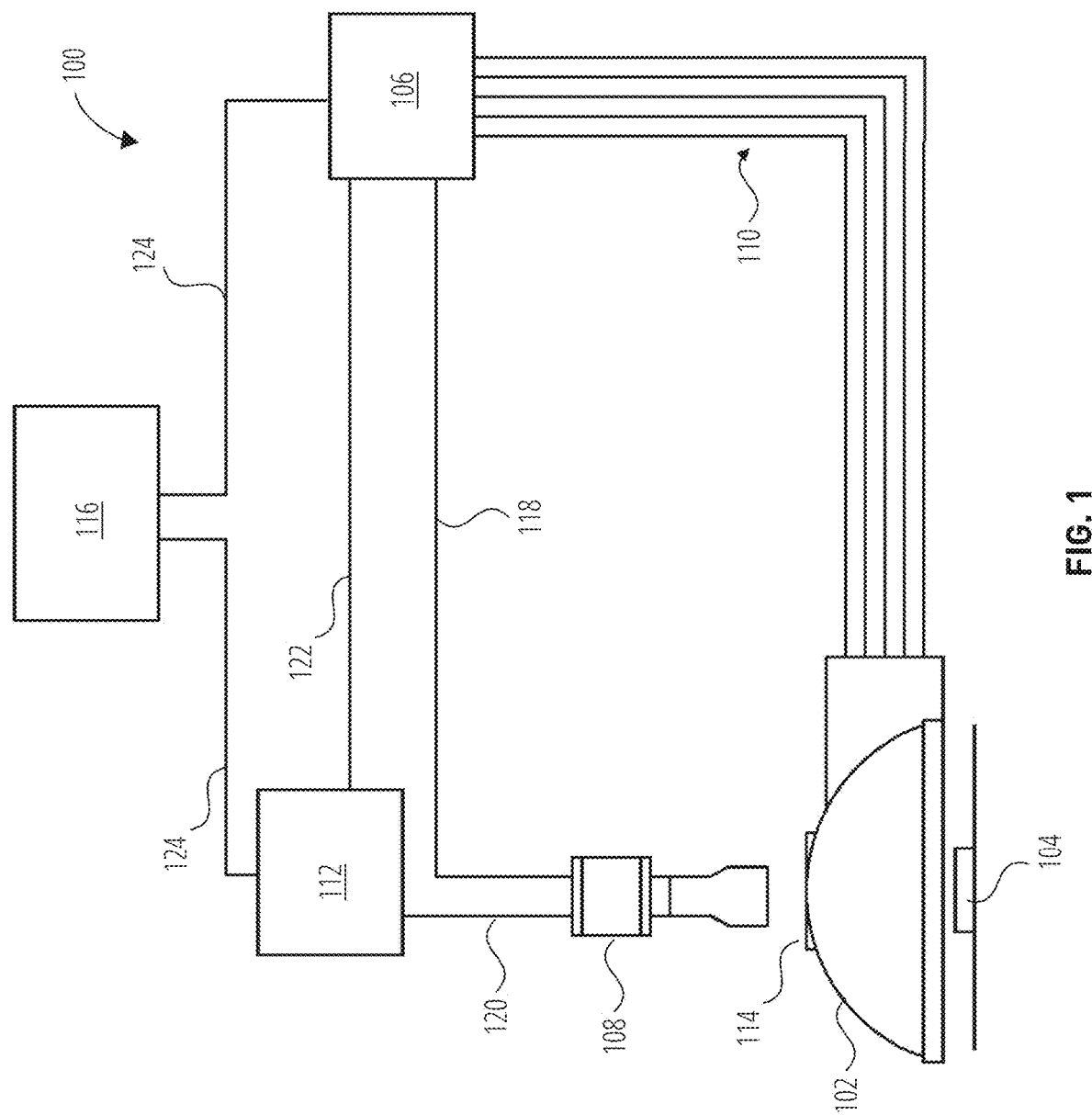
FIG. 1 illustrates a block diagram of an inspection system, according to some examples.

In industrial production, image recognition is used to detect surface features on products, which include, for example, metal castings. However, when capturing images, a conventional light source is frequently not ideal for imaging a product having a particular surface, a particular feature, and/or when inspected in a particular environment. For example, material characteristics that affect light quality of a captured image include reflective qualities, transparent qualities, or black/opaque qualities. In other examples, a conventional light source may not be compatible with imaging different types of features including, for example, actual product features such as points, lines, circles, and so forth, as well as manufacturing defects or other unintended features such as scratches or the presence of dirt. In another example, a conventional light source may not be good for creating satisfactory images in different environments, such as laboratories or production lines. The light quality of captured images directly affects the ability to detect surface features on products, and poor light quality may result in reduced accuracy when identifying such features.

Manufacturing currently faces many obstacles regarding the light sources used for capturing images of industrial products, as mentioned above. For different surface materials, such as materials with reflective, transparent, or black surfaces, various wavelengths and patterns of light emitted by a light source to capture high-quality images have been conventionally necessary for adequate image quality. Further, conventional single light sources do not provide adequate lighting for image capture with different types of features such as product features, scratches, dirt, and features with random locations, sizes, or shapes. Such imagery has conventionally required customized light sources with specific incidence angles and patterns. Finally, conventional light sources have been inadequate for providing adequate lighting for image capture in various environments because different environments, such as laboratories and production lines, typically produce products that are made from different materials under different ambient lighting conditions. Thus, capturing images with adequate quality for detecting features has relied on manual manipulation of distance and geometry between lighting, a camera, and the product, to capture high-quality images.

Additionally, removing heat generated by light-emitting diodes (LEDs) that are located inside the light source and under a diffuser, can be challenging. Configurations of light sources that facilitate this heat transfer can ensure lower operating temperatures, better reliability and longer life of the light source. Furthermore, if contaminants that might be found in the surrounding environment, such as dust or other particulate matter, enter the light source, this can affect the performance and light quality provided by a light source. Accordingly, it is desirable to ensure that the internal components of a light source are sealed from such contamination.

Other technical features may be readily apparent to one skilled in the art from the following figures, descriptions, and claims.

FIG. 1 illustrates a block diagram of an inspection system 100, according to some examples. The inspection system 100 includes a light source 102, a camera 108, a controller 106, an industrial computer 112, and a factory computer 116 and or programmable logic controller (PLC). The factory computer 116 or other factory control unit is in communication with controller 106 and the computer 112 via a wired or wireless factory network 124.

The light source 102 in use illuminates a target object 104. The light source 102 includes a housing containing a number of light emitters as will be described in more detail below. In some examples, a light emitter comprises one or more LEDs, or one or more other light-emitting devices. The light emitters are arranged to provide flexibility in illuminating the target object 104. The light emitters are selectively activated by the controller 106 using one or more power cables 110. A light channel is a unit of lighting that is individually addressable by the controller 106 to illuminate the target object 104. A light channel may thus comprise a single LED or a number of LEDs that are addressable as a group. Preferably, the light source 102 includes at least ten individually addressable light channels each comprising one or more light emitters arranged within the light source 102, to provide lighting flexibility.

The camera 108, which may be mounted to the light source 102 by a mounting ring 114 including tapped holes, captures images of the illuminated target object 104 through a hole in the top of the light source 102. The camera 108 is triggered by the controller 106 via a trigger line 118, synchronized to the actuation of the light emitters in light source 102.

The controller 106 controls operation of the camera 108 and illumination of the target object 104 by the light source 102. The controller 106 receives instructions from the computer 112 via a control line 122. The controller 106 may include hardware components that may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. These hardware components within the user device may be used to execute the various applications, methods, or algorithms disclosed herein independent of other devices disclosed herein.

The controller 106 illuminates the target object according to one or more optimal lighting configurations. The lighting configurations may be defined as a matrix, where each value of the lighting configuration matrix represents a working status of each independently controllable light channel, such as one or more light emitters. The lighting configurations may also be arranged into a configuration sequence, which specifies an order of lighting configurations to be executed for a particular target object 104, such that a number of images under different lighting conditions are captured by the camera 108. A controller 106 can control one or more light sources. In some examples, the controller 106 controls two of the light sources 102 described with reference to FIG. 2, and controls one of the larger light sources 1500 described with reference to FIG. 15 due to the larger number of light emitters in the latter.

The computer 112 runs software that provides a user interface that can be used to specify lighting configurations and sequences, which can be loaded into the controller 106. The computer 112 also instructs operation of the controller 106 via the control line 122, and receives images captured by the camera 108 via a data line 120.

The factory computer 116 provides overall factory control, and can receive operational data and captured images from the controller 106 and the computer 112 via the factory network 124. The factory computer 116 can also provide instructions to control or initiate operation of the inspection system 100, based for example on other factory operations such as the movement of target objects 104 past the light source 102.

Figure 2:
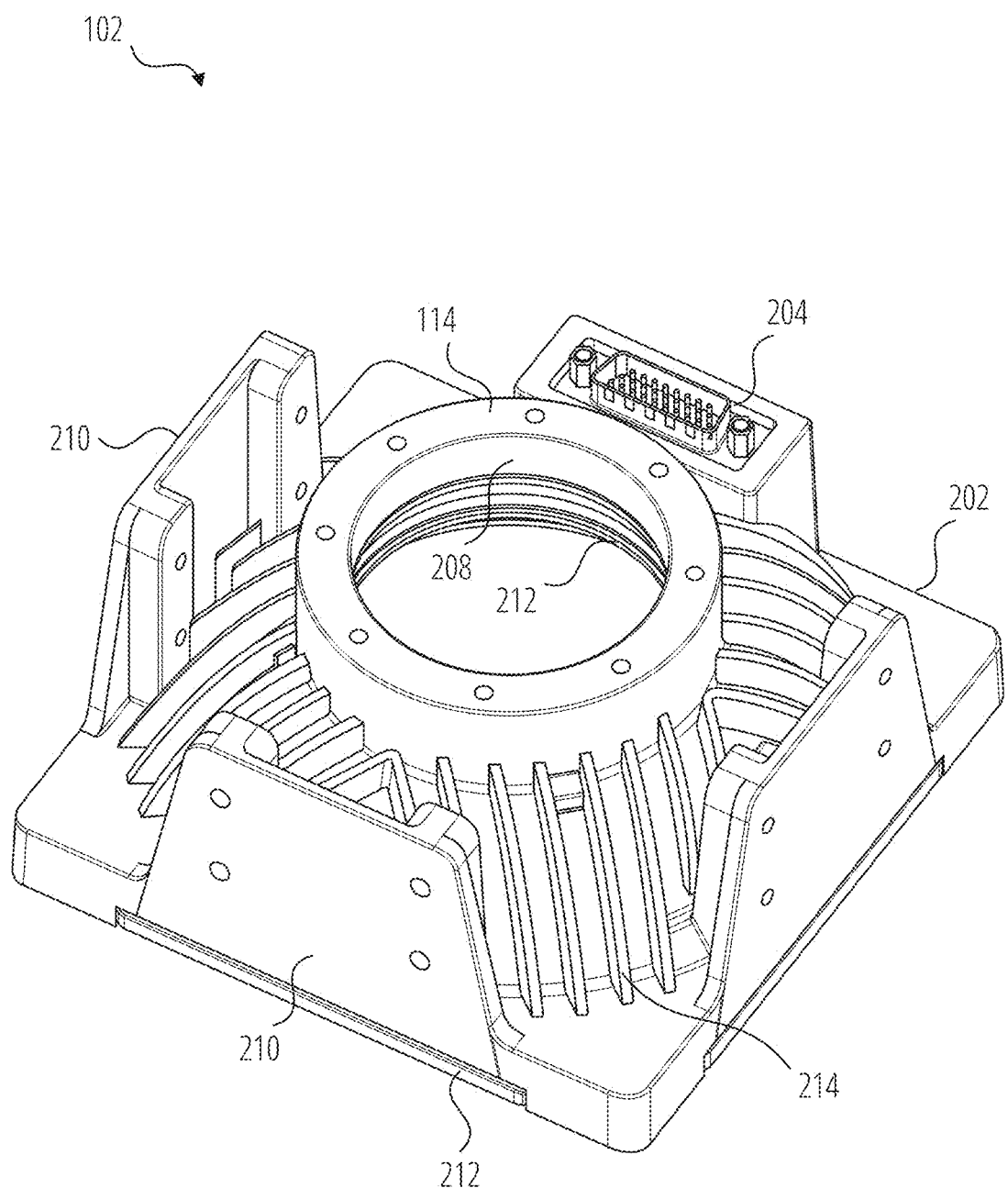
FIG. 2 illustrates a perspective view of one implementation of the light source of FIG. 1, according to some examples.

FIG. 2 illustrates a perspective view of one implementation of the light source 102 of FIG. 1, according to some examples. Visible in FIG. 2 is a dome-shaped main body 202 of the light source 102, which includes a mounting ring 114 to which the camera 108 can be mounted. The mounting ring 114 is located around the upper edge of a ring 208 that defines an aperture in the main body 202 at a first or upper end, through which the camera 108 has a view of the target object 104.

An external connector 204 is also provided, through which electrical power can be provided to the individual LEDs within the light source 102.

Also illustrated in FIG. 2 are one or more faces or locations 210 that can be used to mount the light source 102 in place. In some examples, the main body 202 is made of metal, to provide good heat transfer qualities between the light emitters and the outer surface of the main body 202, which in the illustrated example includes fins 214 to facilitate cooling of the light source 102. One or more diffusers 212 are mounted inside the light source 102 to seal the interior of the light source 102 and to provide light diffusion if required.

Figure 3:
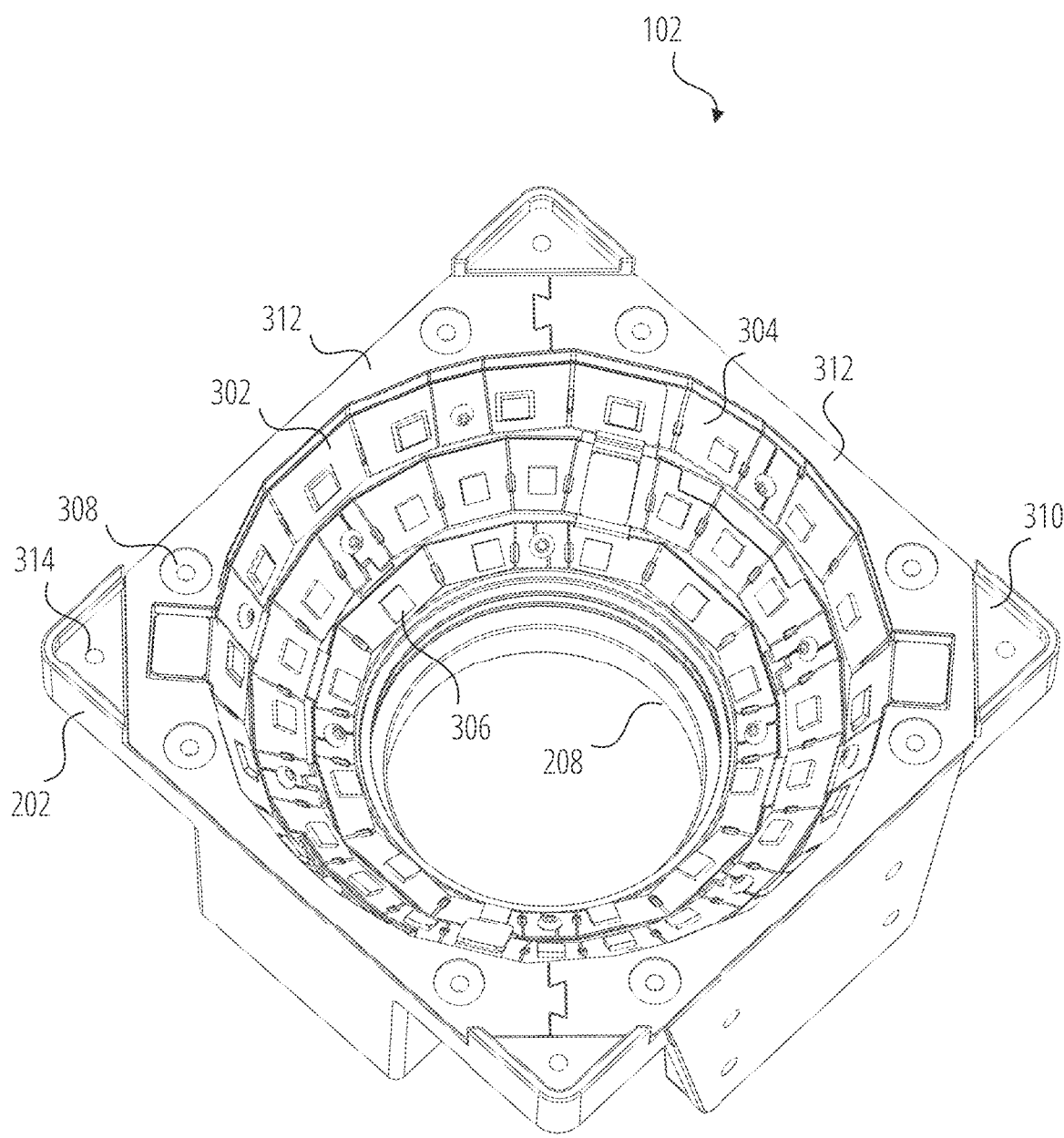
FIG. 3 illustrates a perspective view of the underside of the light source of FIG. 2, according to some examples.

FIG. 3 illustrates a perspective view of the underside of the light source 102 of FIG. 2, showing the positioning of PCBs including light emitters, such as LEDs 306, according to some examples. In this view, the diffusers 212 have been removed to show the detail of the underside of the main body 202 in addition to the positioning of the LEDs 306.

Figure 4:
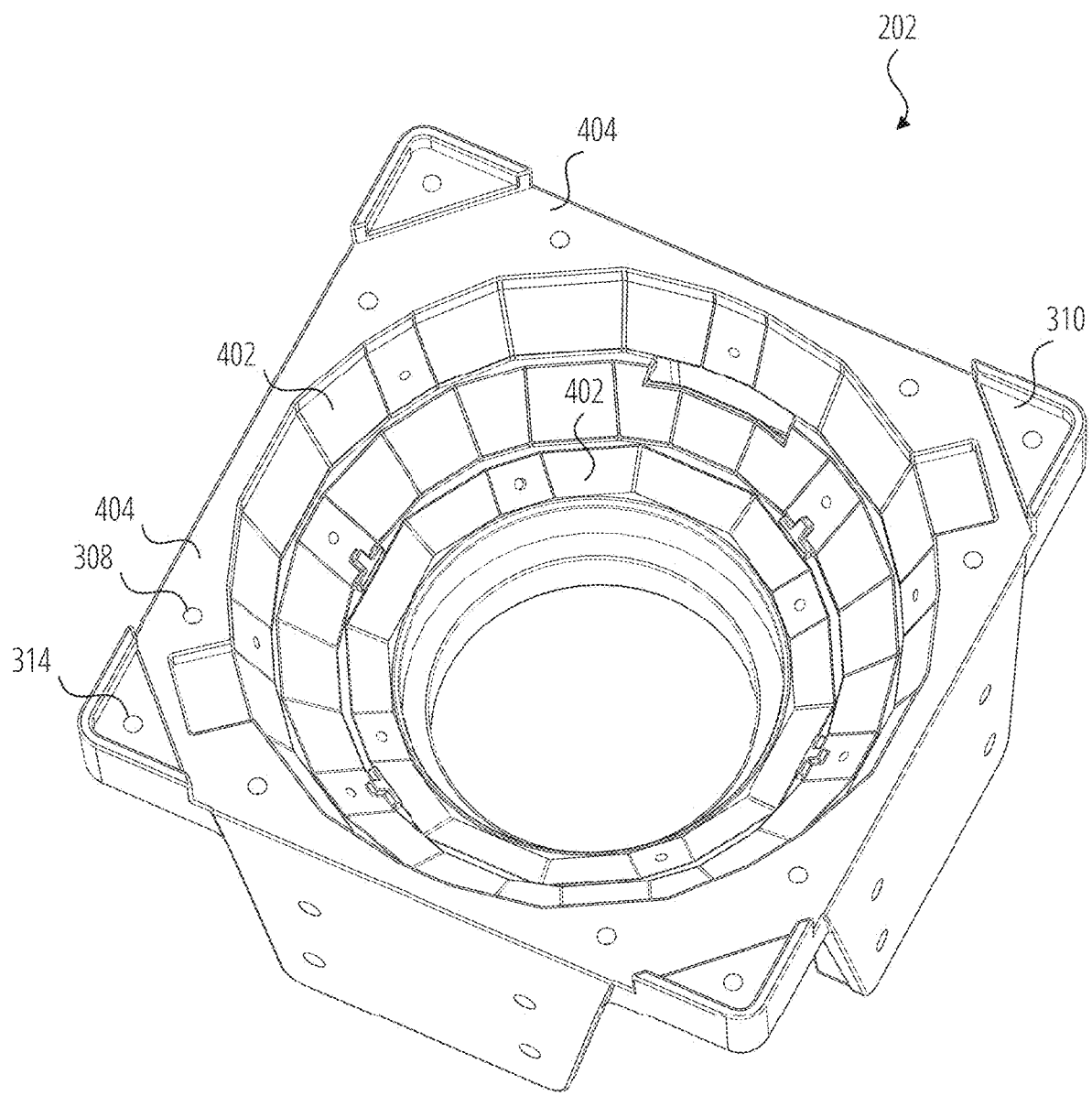
FIG. 4 illustrates a perspective view of the underside of the light source of FIG. 2, according to some examples.

The inner surface of the main body 202 is generally hemispherical in shape and includes a flex PC 302 and four metal-based PCBs 304 mounted to the main body 202, according to some examples. The underside of the main body 202 has flat facets 402 defined thereon that receive corresponding segments of the flex PC 302 and the metal-based PCBs 304 as will be described in more detail below. The facets 402 in the inner surface of the main body 202 are not visible in FIG. 3, since they are located under the metal-based PCBs 304, but the facets 402 in the main body 202 correspond generally to the shape and size of the segments of a particular metal-based PCB 304 and are illustrated in FIG. 4.

Each metal-based PCB 304 includes a metal PCB substrate to which the LEDs 306 are mounted. The metal-based PCBs 304 include at least one connector (see connectors 608, 610 in FIG. 6) for making electrical connection with a flex PC 302. Power is provided to the LEDs 306 from the connector via traces formed on the metal PCB substrate. The high-powered LEDs 306 provide selective illumination of the target object 104 under the control of the controller 106.

In some examples, the flex PC 302 comprises electrical conductors comprising copper traces, encased in plastic, although other materials and forms of connecting cables can be used. In some examples, a thermal interface material may be used between the metal-based PCBs 304 and the main body 202. In some examples, glue may be used between the metal-based PCBs 304 and the main body 202 instead of or in addition to thermal paste. The combination of the stack comprising the metal substrate of the metal-based PCBs 304, the thermal interface material, and the metal main body 202 provides good thermal conductivity between the LEDs 306 and the fins 214 of the main body 202. This is further facilitated by the matching of the segments 618 of the metal-based PCBs 304 and the facets of the main body 202.

The metal substrate of the metal-based PCBs 304 is bent into segments matching the facets of the inner surface of the main body 202, while also facilitating heat transfer between the LEDs 306 and the main body 202. Aluminum is used as the metal substrate in the examples illustrated herein, but any suitable ductile material with good heat transfer qualities can be used.

A clear diffuser 902 (see FIG. 9) is received against a gasket 312 positioned against a lower sealing surface 404

(see FIG. 4) at an outer periphery of a lower or second end of the main body 202. Diffuser mounting holes 308 are provided in the main body 202 for the mounting of the clear diffuser 902.

FIG. 4 illustrates a perspective view of the underside of the main body 202 of FIG. 2, according to some examples. In this view, the facets 402 in the main body 202 can be seen, as well as the sealing surface 404. As mentioned, the facets 402 correspond generally to the shape and size of the segments 618 of a particular metal-based PCB 304 and are illustrated in FIG. 4.

Figure 5:
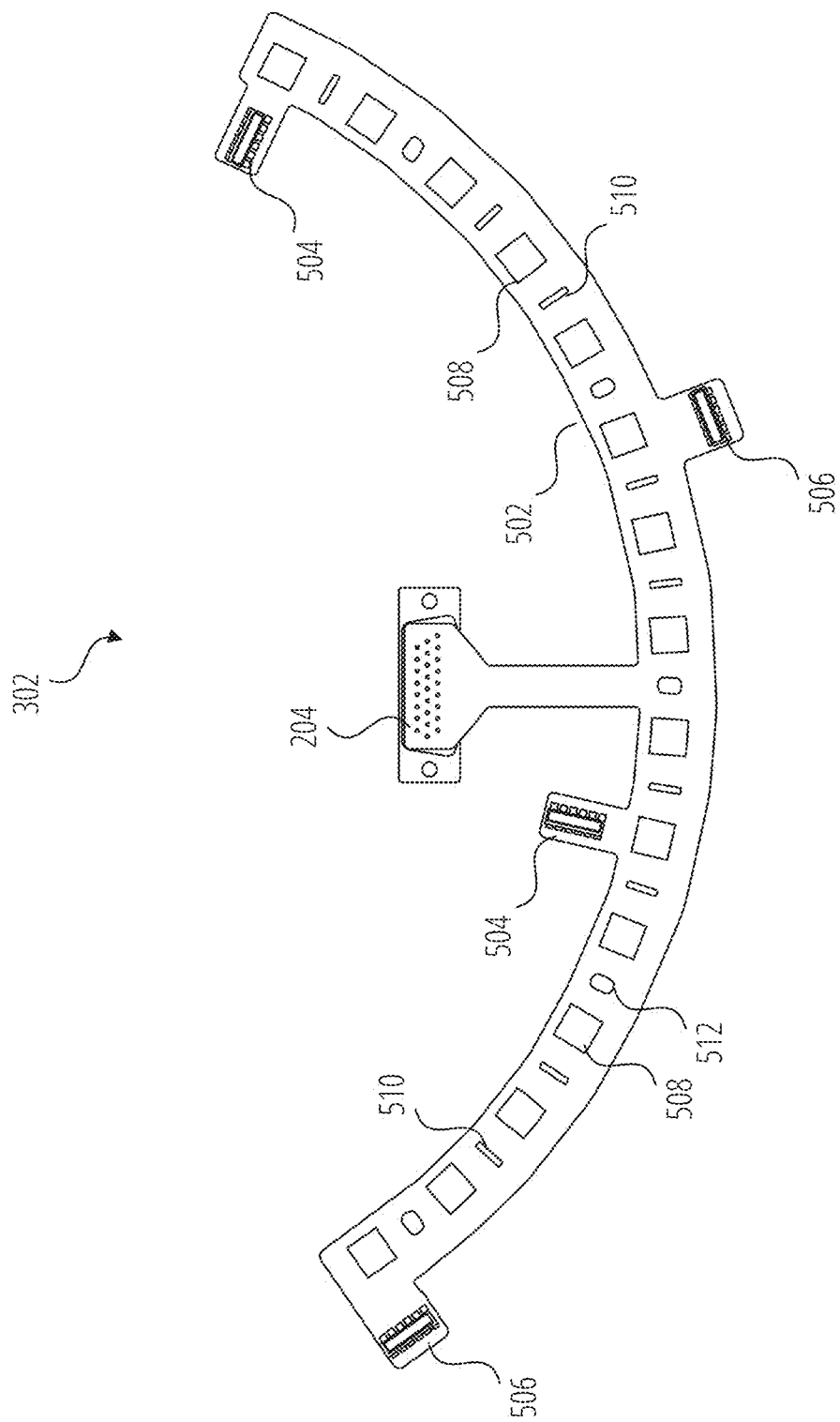
FIG. 5 illustrates the underside of a flex printed circuit (PC), according to some examples.

FIG. 5 illustrates the underside of a flex printed circuit (PC), according to some examples. The flex PC 302 is used to make electrical connections between the external connector 204 and four metal-based PCBs 304 in the light source 102 illustrated in FIG. 2 and FIG. 3. The flex PC 302 overlays at least part of the metal-based PCBs 304 in the light source 102 of FIG. 2, although a flex PC may alternatively or additionally underlay at least part of the metal-based PCBs 304.

The flex PC 302 includes a flexible substrate 502 through which apertures 508 are defined, into which the LEDs 306 of underlying metal-based PCBs 304 fit, in some examples. The flex PC 302 includes connectors 506 that connect with connectors 610 on second metal-based PCBs 604 as well as connector 504 that connect with connectors 608 on first metal-based PCBs 602 (see FIG. 6).

The flex PC 302 includes mounting holes 512 used to mount the flex PC 302 to the main body 202 in use. Slots 510 are also provided in the flex PC 302, which correspond to the edges of the flat facets formed on the inner surface of the main body 202. The slots 510 provide extra flexibility for conforming the flex PC 302 to the faceted inner surface of the main body 202.

Figure 6:
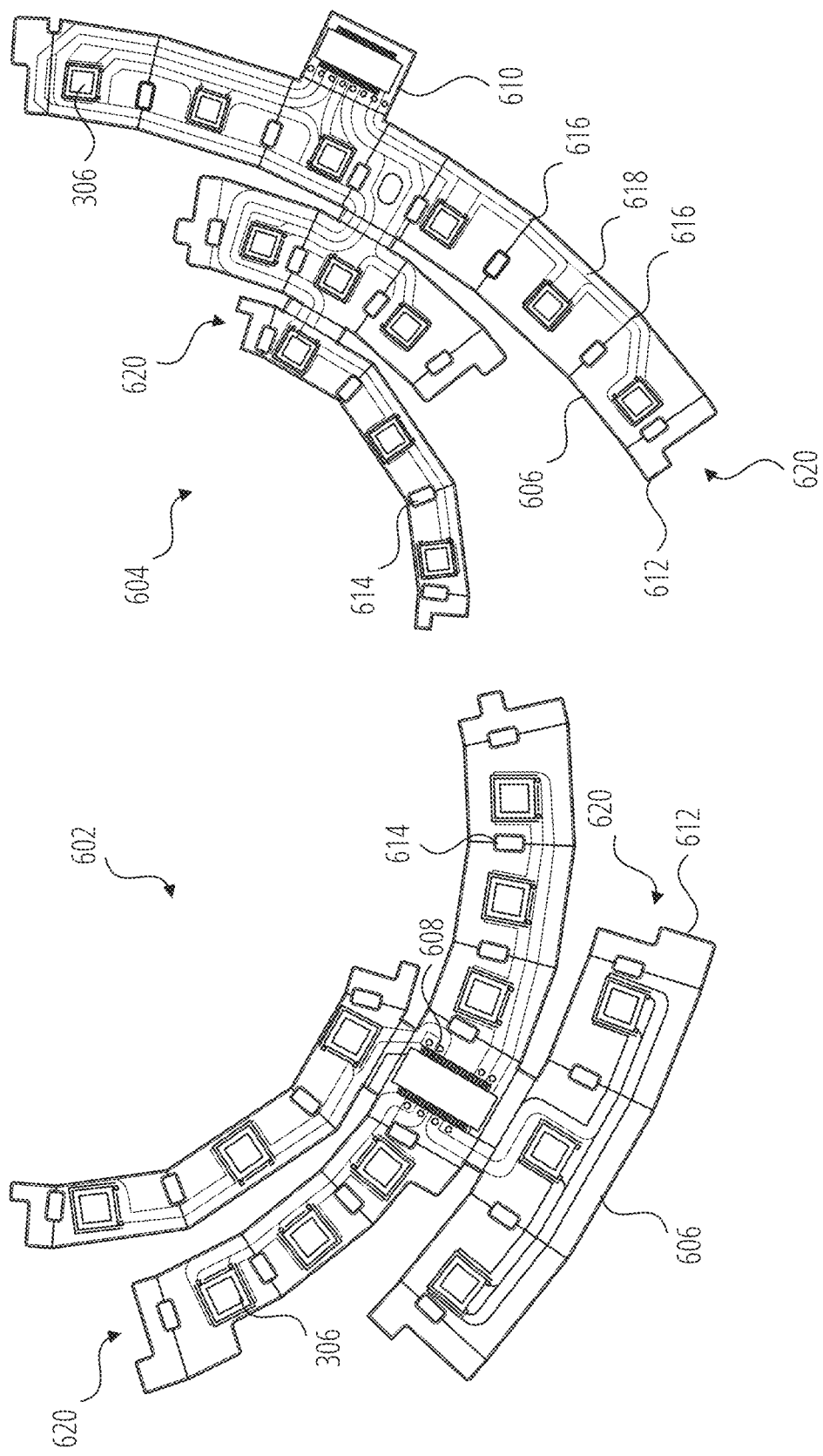
FIG. 6 illustrates the top sides of two metal-based PCBs, according to some examples.

FIG. 6 illustrates the top sides of a first metal-based PCB 602 and a second metal-based PCB 604, according to some examples. Two sets of the illustrated metal-based PCBs 602, 604 together provide coverage of the interior of the main body 202 to provide consistent light output from the light source 102.

Each of the metal-based PCBs 602, 604 include a metal substrate 606 to which LEDs 306 are mounted as shown. Also provided are slots 614 and bend lines 616 to facilitate correct positioning and bending of the metal-based PCBs 602, 604 to conform to the faceted inner surface of the main body 202. The slots 614 provide extra flexibility when bending the metal-based PCBs 602, 604 to fit the faceted inner surface of the main body 202, and the bend lines 616 provide visual alignment cues during the bending process. The bend lines 616 divide each row 620 into segments 618 that correspond to the facets defined in the inner surface of the main body 202.

The first metal-based PCB 602 includes a connector 608 that connects to a connector 504 on the flex PC 302. The second metal-based PCB 604 includes a connector 610 that connects to a connector 506 on the flex PC 302.

The metal-based PCBs 602, 604 each comprise a number of rows 620. A tab 612 is formed at the end of each row 620, for providing additional purchase to the fasteners used to mount the metal-based PCBs 602, 604 to the inner surface of the main body 202. The tabs 612 on each row 620 of the first metal-based PCB 602 are complementary to the tabs 612 of corresponding rows 620 of the second metal-based PCB 604. See further FIG. 13.

FIG. 7 is an exploded perspective view of a main body 202, flex PC 302, two first metal-based PCBs 602 and two second metal-based PCBs 604. As can be seen, the flex PC 302 and the metal-based PCBs 602, 604 position the LEDs 306 in a series of rings, as can also be seen in FIG. 3 and FIG. 8.

Figure 8:
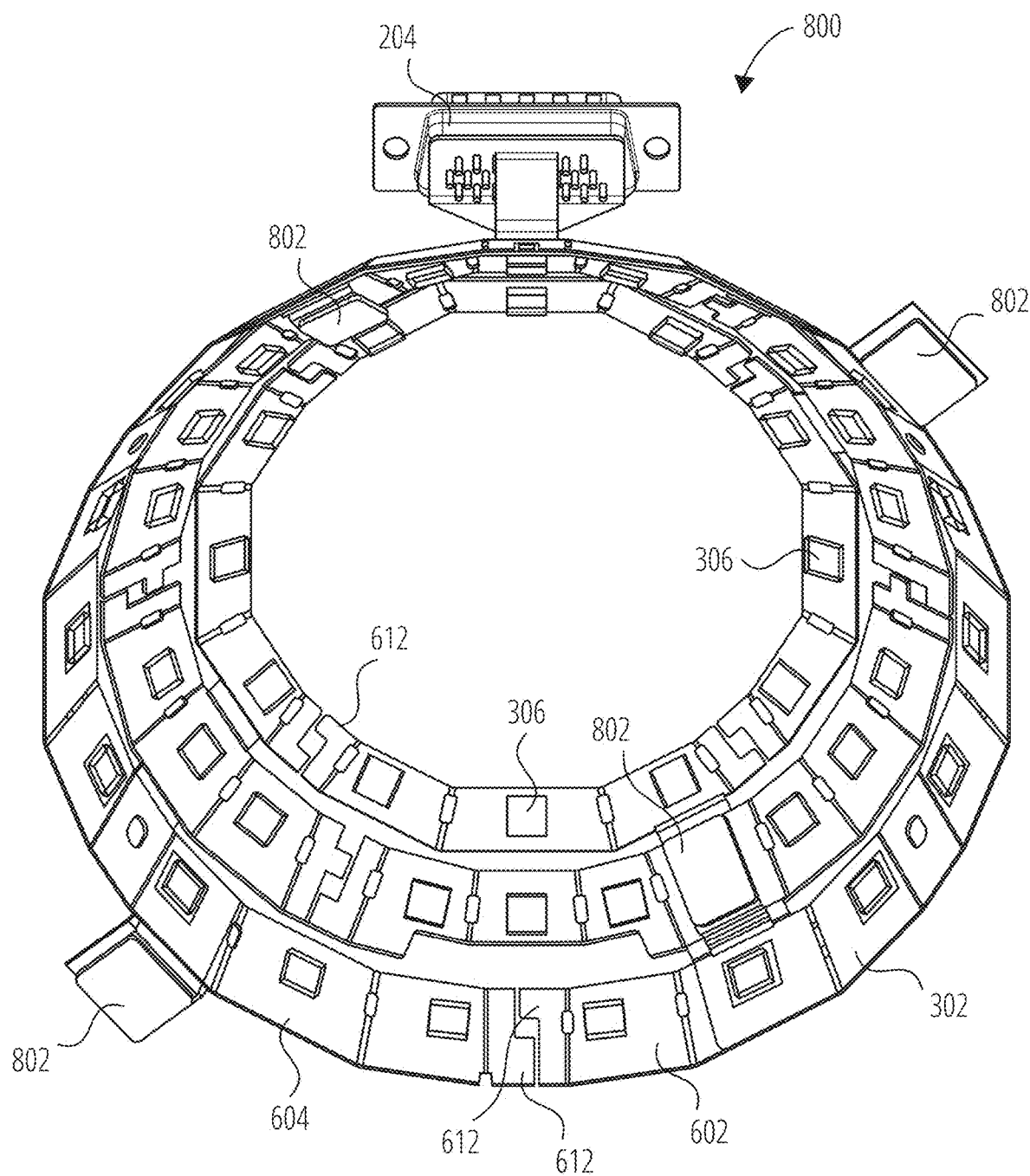
FIG. 8 is a perspective view of a partial assembly comprising a flex PC, two first metal-based PCBs and two second metal-based PCBs, according to some examples.

FIG. 8 is a perspective view of a partial assembly comprising a flex PC 302, two first metal-based PCBs 602 and two second metal-based PCBs 604. The assembly 800 is shown removed from the main body 202 for illustrative purposes only. Also visible in FIG. 8 are stiffener components 802 that protect the connectors 504, 506 on the flex PC 302 and provide support during installation of the connectors 504, 506. The connectors 504, 506 of the flex PC 302 cover the connectors 608, 610 on the metal-based PCBs 602, 604, which are thus also not visible. The complementary tabs 612 on adjacent metal-based PCBs 602, 604 can also be seen.

Figure 9:
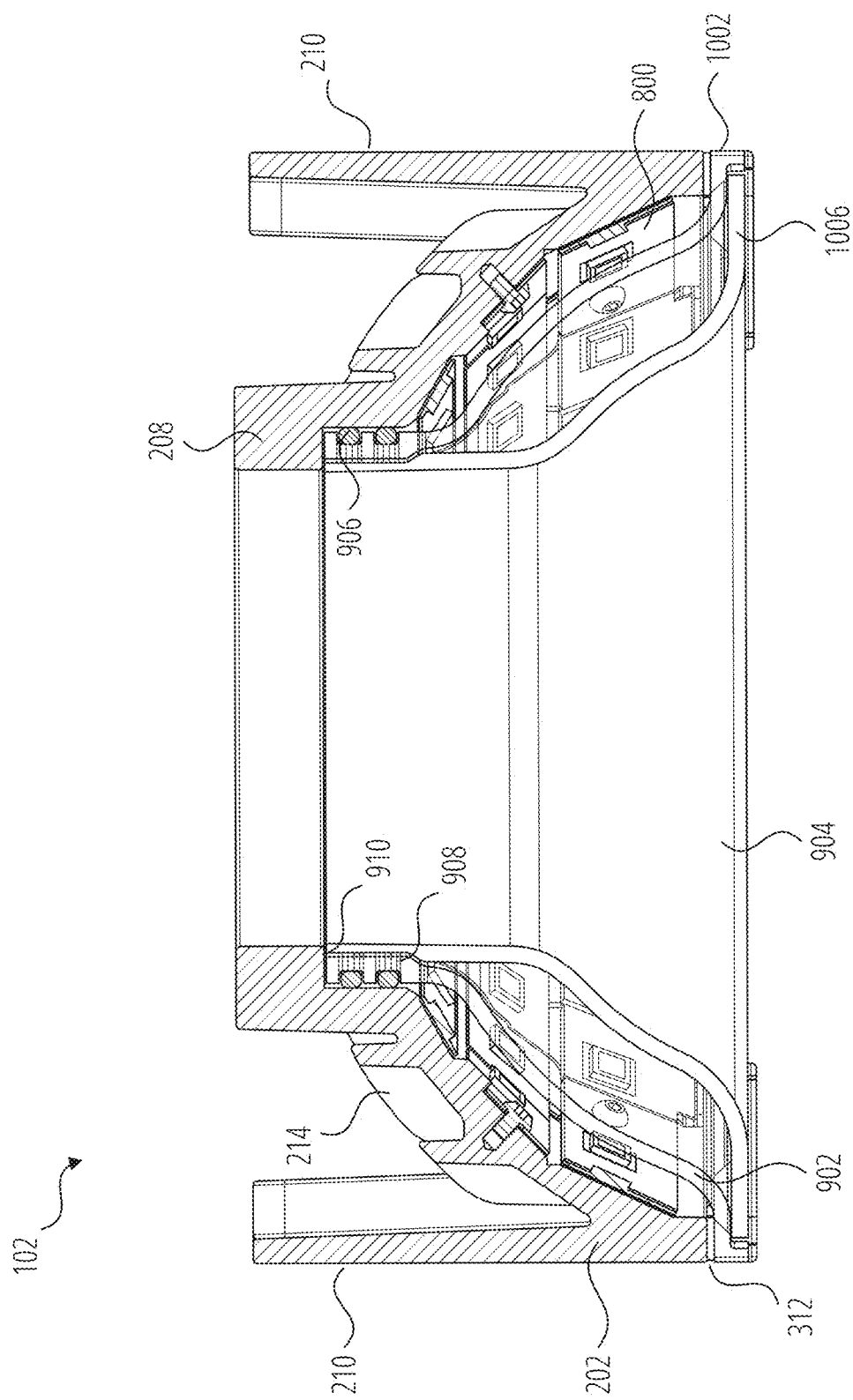
FIG. 9 is a cross-section of a fully assembled light source, according to some examples.

FIG. 9 is a cross-section of a fully assembled light source 102, according to some examples. The illustrated light source 102 includes a main body 202, a flex and metal-based PCB assembly 800, a clear diffuser 902 and a translucent diffuser 904.

The clear diffuser 902 seats against an undercut 910 under the ring 208 of the main body 202. This contact area is sealed by means of one or more O-rings 906 located in grooves 908 formed in the upper end of the clear diffuser 902. A flange 1002 at the lower end of the clear diffuser 902 is fastened to the main body 202 by means of fasteners that pass through the diffuser mounting holes 308 in the main body 202 and through mounting holes 1004 in the clear diffuser 902. The gasket 312 is located between the flange 1002 of the clear diffuser 902 and the sealing surface 404 at an outer periphery of a lower or second end of the main body 202. The O-rings 906 and the gasket 312 thus provide an airtight seal between the clear diffuser 902 and the main body 202, which prevents contaminants from entering the region between the clear diffuser 902 and the inner surface of the main body 202.

The translucent diffuser 904, which is optional and removable, is inserted into the clear diffuser 902 in use, if desired. The translucent diffuser 904 has a bevel 1008 that seats against a corresponding surface on the inside of the clear diffuser 902. A flange 1006 at the lower edge of the translucent diffuser 904 is fastened to the main body 202 by means of fasteners passing through mounting holes 1014 in the flange 1006 and into the diffuser mounting holes 314 in pads 310 located at the corners of the main body 202.

Figure 10:
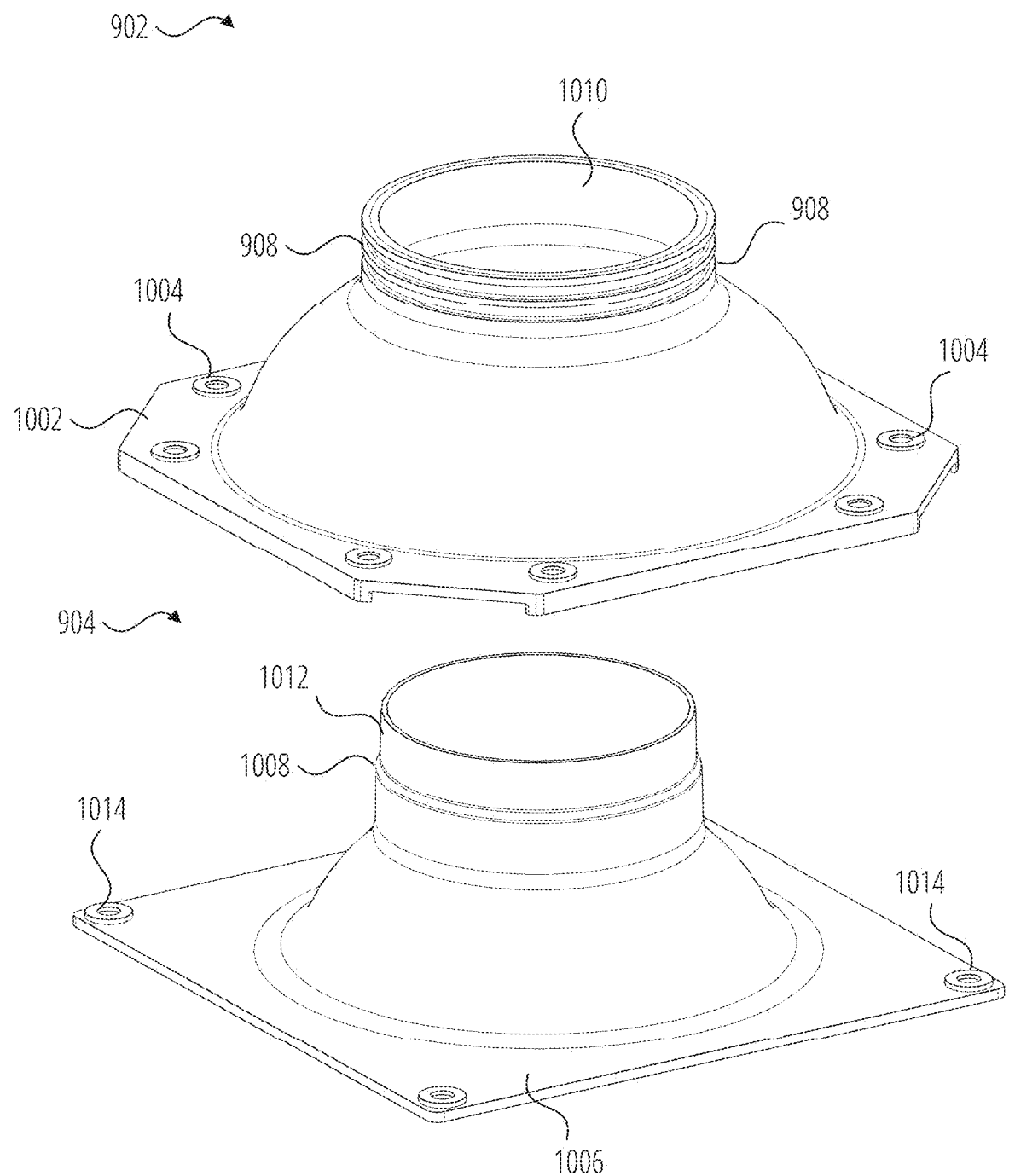
FIG. 10 is a perspective view of a clear diffuser and a translucent diffuser for use with the light source of FIG. 2, according to some examples.

FIG. 10 is a perspective view of a clear diffuser 902 and a translucent diffuser 904, according to some examples. As can be seen, the clear diffuser 902 includes grooves 908 formed in an upper tubular portion 1010 thereof, into which the O-rings 906 are received. A flange 1002 has mounting holes 1004 formed therein for mounting the clear diffuser 902 to the main body 202.

The translucent diffuser 904 includes a bevel 1008 formed on the outside of an upper tubular portion 1012 thereof. An upper tubular portion 1012 of the translucent diffuser 904 is received inside an upper tubular portion 1010 of the clear diffuser 902. A flange 1006 has mounting holes 1014 formed therein for mounting the translucent diffuser 904 to the main body 202 as described above.

Figure 11:
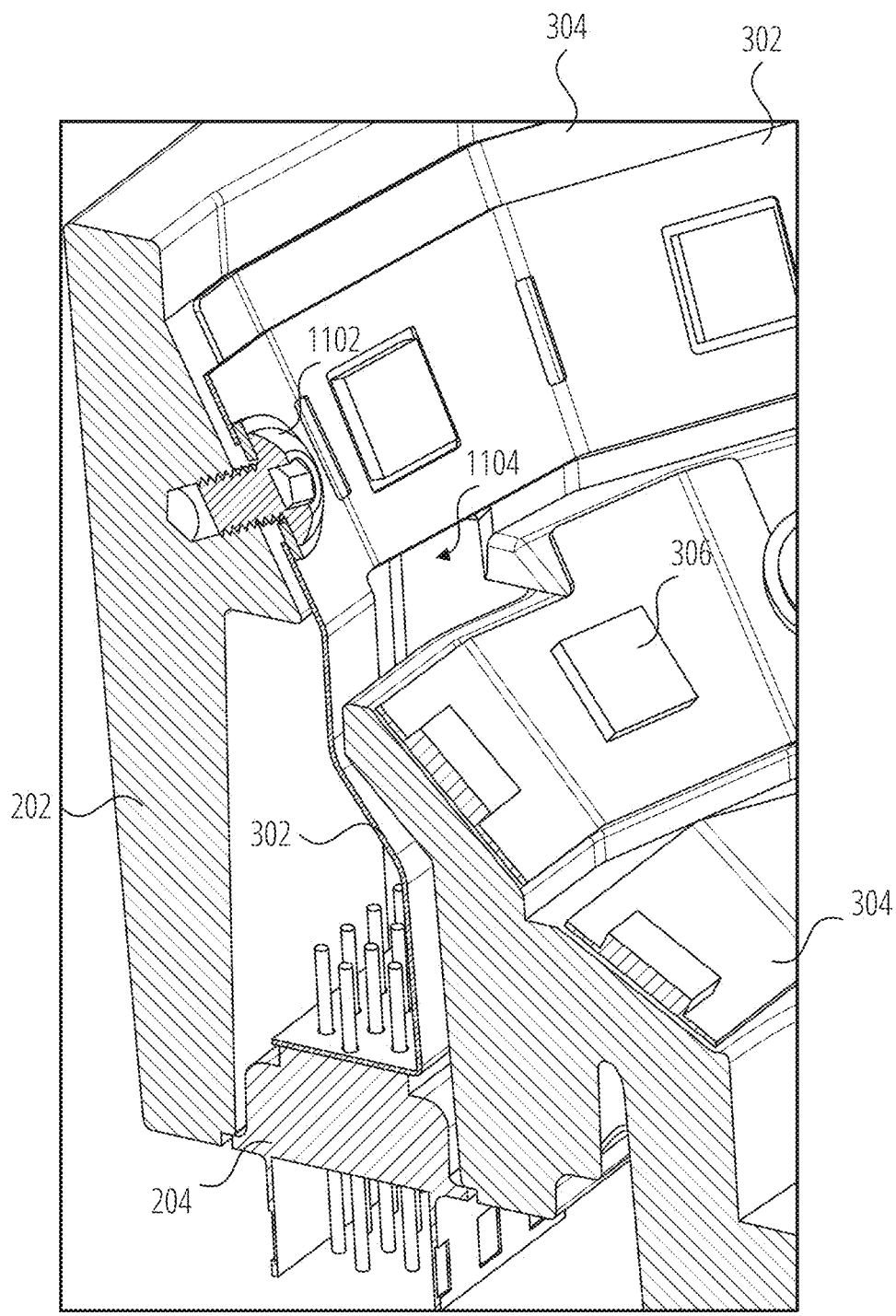
FIG. 11 is a perspective partial cross-sectional view of the main body of the light source of FIG. 2, according to some examples.

FIG. 11 is a perspective partial cross-sectional view of a main body 202, according to some examples. Shown are two metal-based PCBs 304, a flex PC 302 overlaying at least part of a metal-based PCB 304, and the external connector 204 of the flex PC 302.

The metal-based PCBs 304 are bent into segments corresponding to the facets forming the inner surface of the main body 202 before they are put in place against the inner surface of the main body 202. The flex PC 302 is also bent into segments corresponding to the facets forming the inner surface of the main body 202 before it is put in place over one or more of the metal-based PCBs 304 and the connectors of the flex PC 302 and the metal-based PCBs 304 are connected.

The flex PC 302 passes through slot 1104 in the main body 202 to provide an electrical connection to the exterior of the main body 202 by means of the external connector 204. The flex PC 302 and the metal-based PCBs 304 are held in place by several fasteners 1102. The external connector 204 is held in place in the main body 202 by fasteners.

Figure 12:
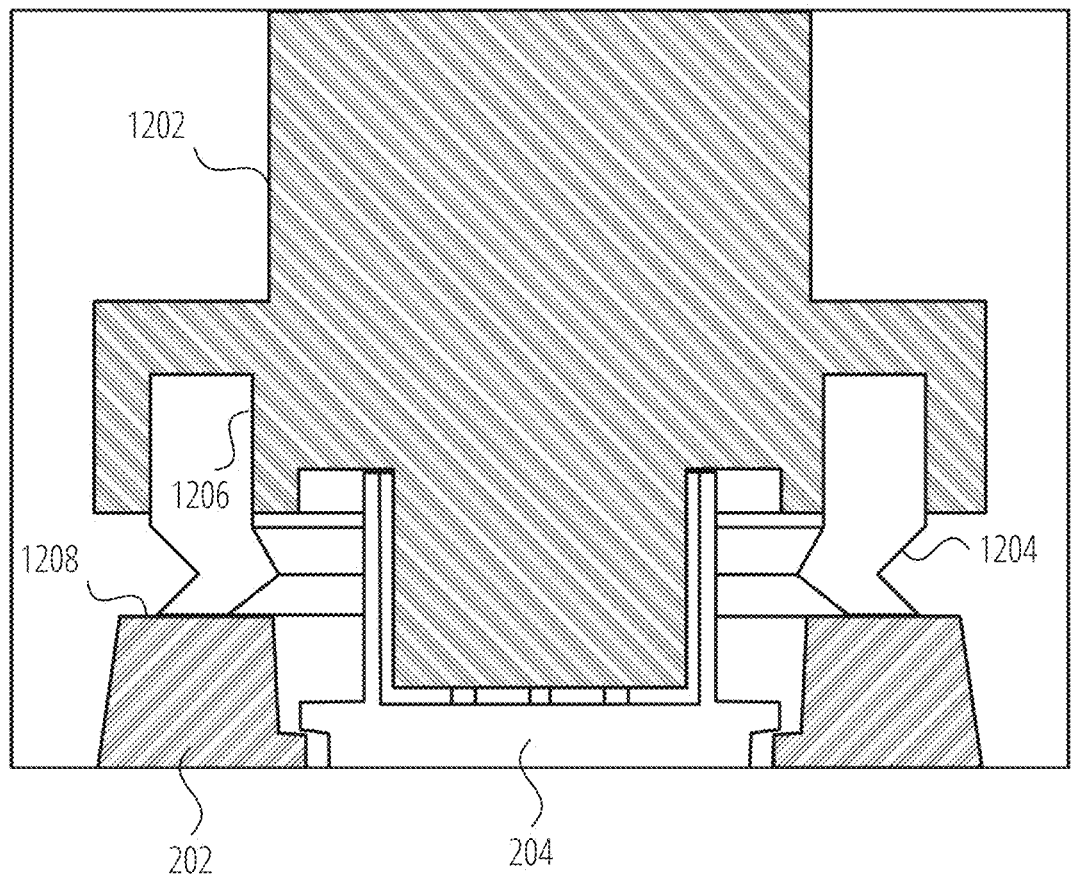
FIG. 12 is a partial cross-sectional view of the external connector of the light source of FIG. 2 and a connector shell of a power cable, according to some examples.

FIG. 12 is a partial cross-sectional view of the external connector 204 of the light source of FIG. 2 and a connector shell 1202 of a power cable 110, according to some examples. As can be seen, the connector shell 1202 includes a gasket 1204 located in a groove 1206. The gasket encircles the external connector 204 and makes sealing contact with a flat surface 1208 of the main body 202 that likewise encircles the external connector 204.

The gasket 1204 between the connector shell 1202 and the main body 202 prevents ingress of contaminants, in conjunction with the O-rings 906 and the gasket 312.

Figure 13:
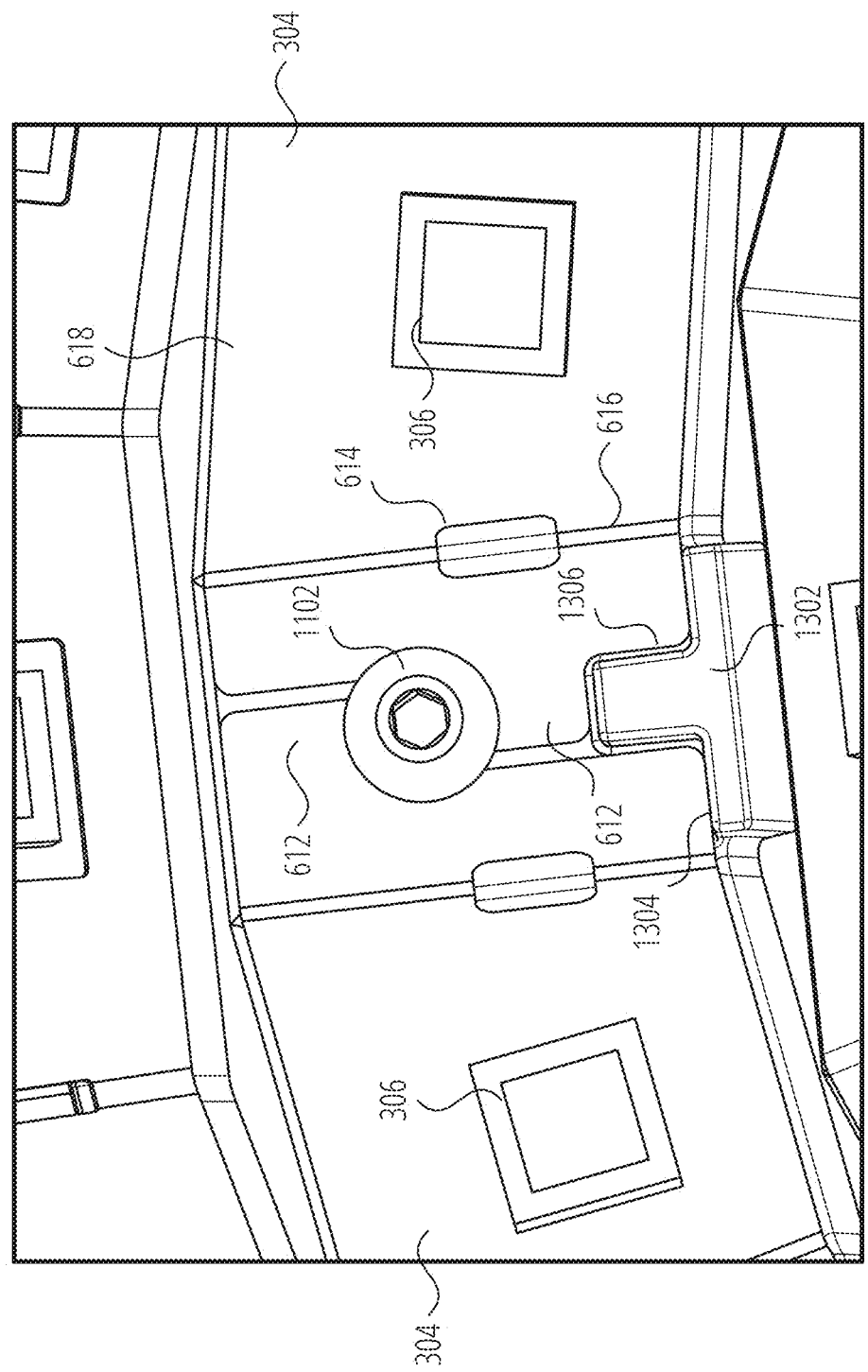
FIG. 13 is a perspective view showing how metal-based PCBs are fastened to the main body, according to some examples.

FIG. 13 is a perspective view showing how metal-based PCBs 304 are fastened to the main body 202, according to some examples. Adjacent metal-based PCBs 304 meet at and are held in place by a threaded fastener 1102. Horizontal edges of the tabs 612 of the two metal-based PCBs 304 respectively are located under the head of the fastener, in addition to part of the vertical edges at the end of each metal-based PCB 304. This additional contact between the fastener 1102 and the metal-based PCBs 304 provides more secure fastening of the metal-based PCBs 304.

Assembly of the metal-based PCBs 304 into the main body 202 is facilitated by locating features 1302 located below the fasteners 1102 at the meeting points of adjacent metal-based PCBs 304. The locating features 1302 provide horizontal datum surfaces 1304 to assist with vertical positioning of the metal-based PCBs 304 as well as vertical datum surfaces 1306 to assist with horizontal positioning of the metal-based PCBs 304. The illustrated locating features 1302 are T-shaped, but of course other shapes and configurations are possible.

Also shown in FIG. 13 are the slots 614 in the metal-based PCBs 304 to assist with bending each metal-based PCB 304 into segments corresponding to the facets of the inner surface of the main body 202.

Figure 14:
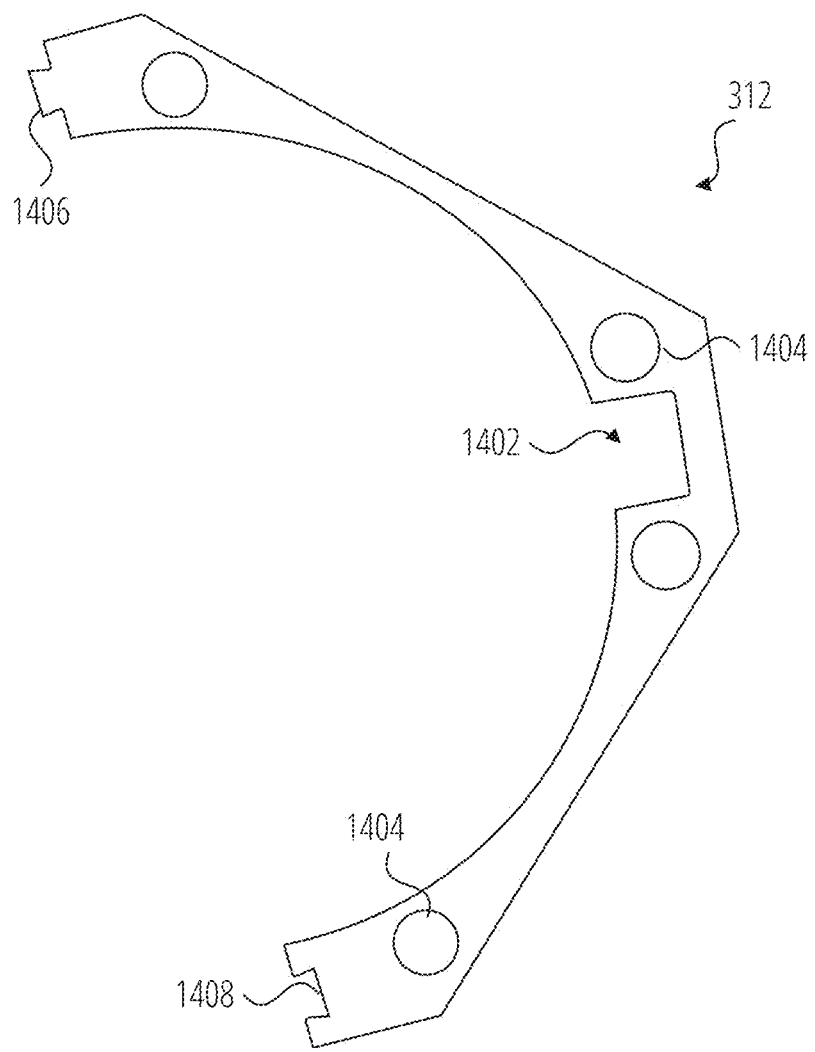
FIG. 14 is a top view of a gasket for use in the main body of the light source of FIG. 2, according to some examples.

FIG. 14 is a top view of a gasket 312 for use in the main body 202, according to some examples. As described above with reference to FIG. 9 and FIG. 10, the gasket 312 is located between the flange 1002 of the clear diffuser 902 and the sealing surface 404 of the main body 202. The gasket 312 has a shape that corresponds to the shape of the sealing surface 404, including a cutout 1402 to accommodate the stiffener component 802 of the flex PC 302, and holes 1404 corresponding to the diffuser mounting holes 308 in the main body 202.

The gasket 312 also includes an interlocking feature 1406 that engages with an interlocking cutout 1408 in a second gasket 312 that together provide a gasket that covers the entire sealing surface 404 of the main body 202.

Figure 15:
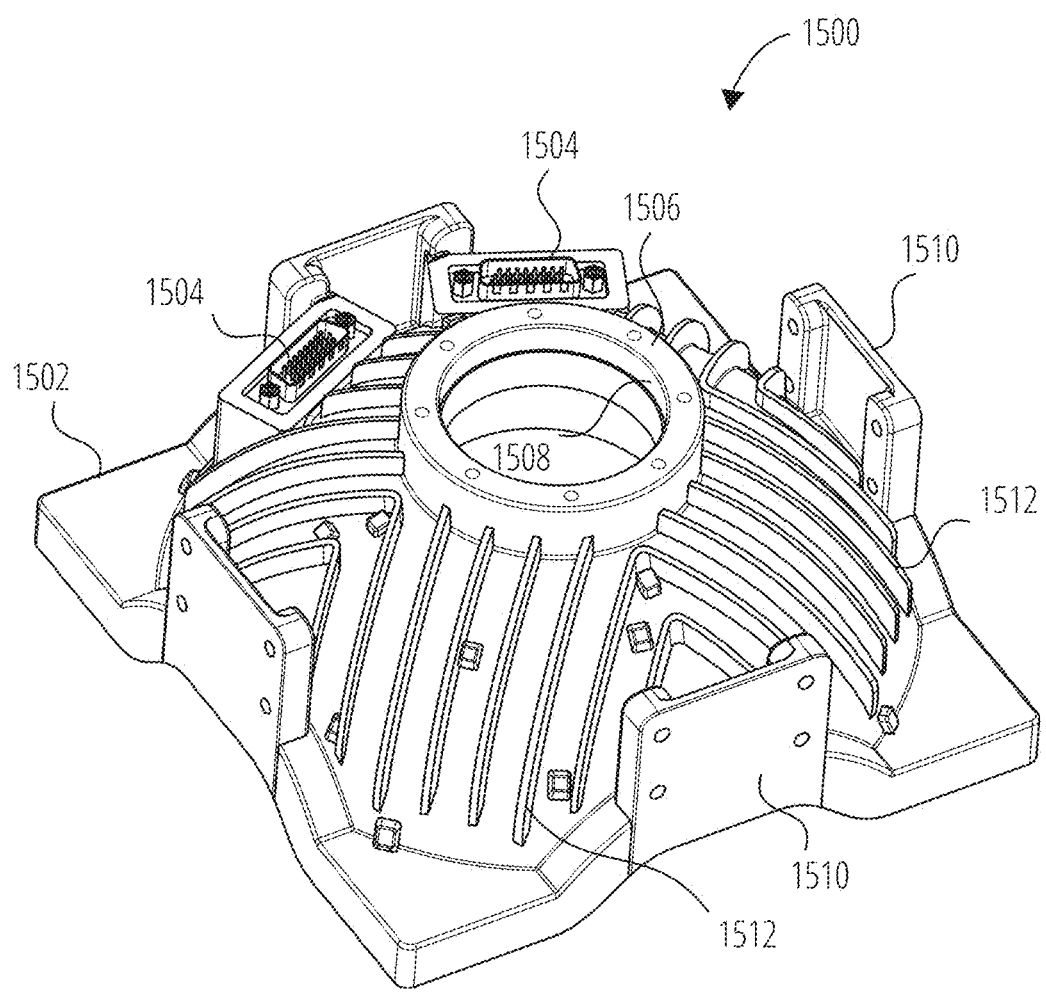
FIG. 15 illustrates a perspective view of another implementation of the light source of FIG. 1, according to some examples.

FIG. 15 illustrates a perspective view of another implementation of the light source of FIG. 1, according to some examples. The light source 1500 includes a larger dome-shaped main body 1502 that includes a mounting ring 1506 to which a camera 108 can be mounted. The mounting ring 1506 is located around the upper edge of a ring 1508 that defines an aperture in the light source 1500 at a first or upper end, through which the camera 108 has a view of the target object 104.

The light source 1500 is larger than the light source 102 and two external connectors 1504 are provided, through which electrical power can be provided to the light channels within the light source 1500.

One or more mounting faces or locations 1510 can be used to mount the light source 1500 in place. In some examples, the main body 1502 is made of metal, to provide good heat transfer qualities between the light emitters and the outer surface of the main body 1502, which in the illustrated example includes fins 1512 to facilitate cooling of the light source 1500.

As before, one or more diffusers 1802, 1804 (not shown, see FIG. 18) are mounted inside the light source 1500 to seal the interior of the light source 1500 and to provide appropriate light diffusion as required.

As with the main body 202, the inner surface of the main body 1502 has facets against which corresponding segments of metal-based PCBs 1602 are mounted as described above with reference to main body 202. However, due to the space available in the larger main body 1502, connections between the metal-based PCBs and the external connectors 1504 are made with flex PCs 1700, which are routed under and between the metal-based PCBs. Otherwise, other than adjustments for size, the basic configuration of a faceted inner surface with metal-based PCBs bent into matching segments of the light source 1500 is the same as the light source 102 as described above.

Figure 16:
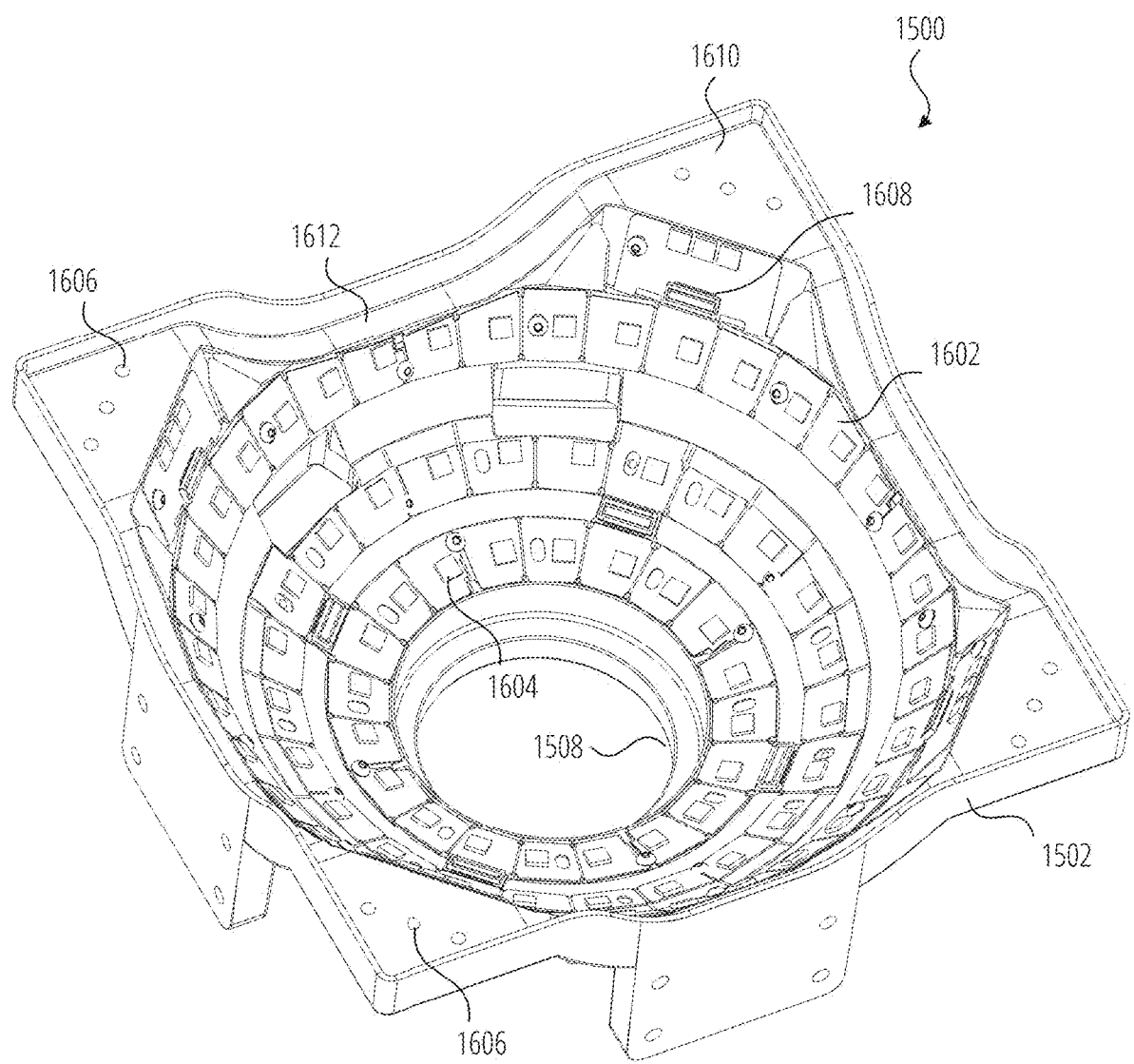
FIG. 16 illustrates a perspective view of the underside of the light source of FIG. 15, according to some examples.

FIG. 16 illustrates a perspective view of the underside of the light source 1500 of FIG. 15, showing the positioning of PCBs including light emitters, such as LEDs 1604, according to some examples. For purposes of clarity, diffusers 1802, 1804 and flex PCs 1700 have been omitted.

As before, the inner surface of the main body 1502 is generally hemispherical in shape and includes flex PCs 1700 mounted thereto, according to some examples. The underside of the main body 1502 has flat facets defined thereon that receive corresponding segments of metal-based PCBs 1602. The facets in the inner surface of the main body 1502 are not visible in FIG. 16, since they are located under the metal-based PCBs 1602, but the facets in the main body 1502 correspond generally to the shape and size of the segments of a particular metal-based PCB 1602 as for the main body 202 described above.

Each metal-based PCB 1602 includes a metal PCB substrate to which the LEDs 1604 are mounted. The metal-based PCBs 1602 include at least one connector 1608 for making electrical connection with a flex PC 1700. Power is provided to the LEDs 1604 from the connector 1608 via traces formed on the metal PCB substrate. The high-powered LEDs 1604 provide selective illumination of the target object 104 under the control of the controller 106.

In some examples, a thermal interface material is used between the metal-based PCBs 1602 and the main body 1502. In some examples, glue may be used between the metal-based PCBs 1602 and the main body 1502 instead of or in addition to thermal paste. The combination of the stack comprising the metal substrate of the metal-based PCBs 1602, the thermal interface material, and the metal main body 1502 provides good thermal conductivity between the LEDs 1604 and the fins 1512 of the main body 1502.

The metal substrates of the metal-based PCBs 1602 are also bent into segments matching the facets of the inner surface of the main body 1502, which also facilitates heat transfer between the LEDs 1604 and the main body 1502.

Aluminum is used as the metal substrate in the examples illustrated herein, but any suitable ductile material with good heat transfer qualities can be used.

A clear diffuser 1802 (see FIG. 18) is received against a gasket positioned against a lower sealing surface 1612 of the main body 1502. Optionally, a translucent diffuser 1804 is then mounted to the main body 1502 against the clear diffuser 1802. Diffuser mounting holes 1606 are provided in the main body 1502 for this purpose. Diffuser mounting holes 1606 are provided in pads 1610 located at the corners of the main body 1502 for the mounting of one or more diffusers.

Figure 17:
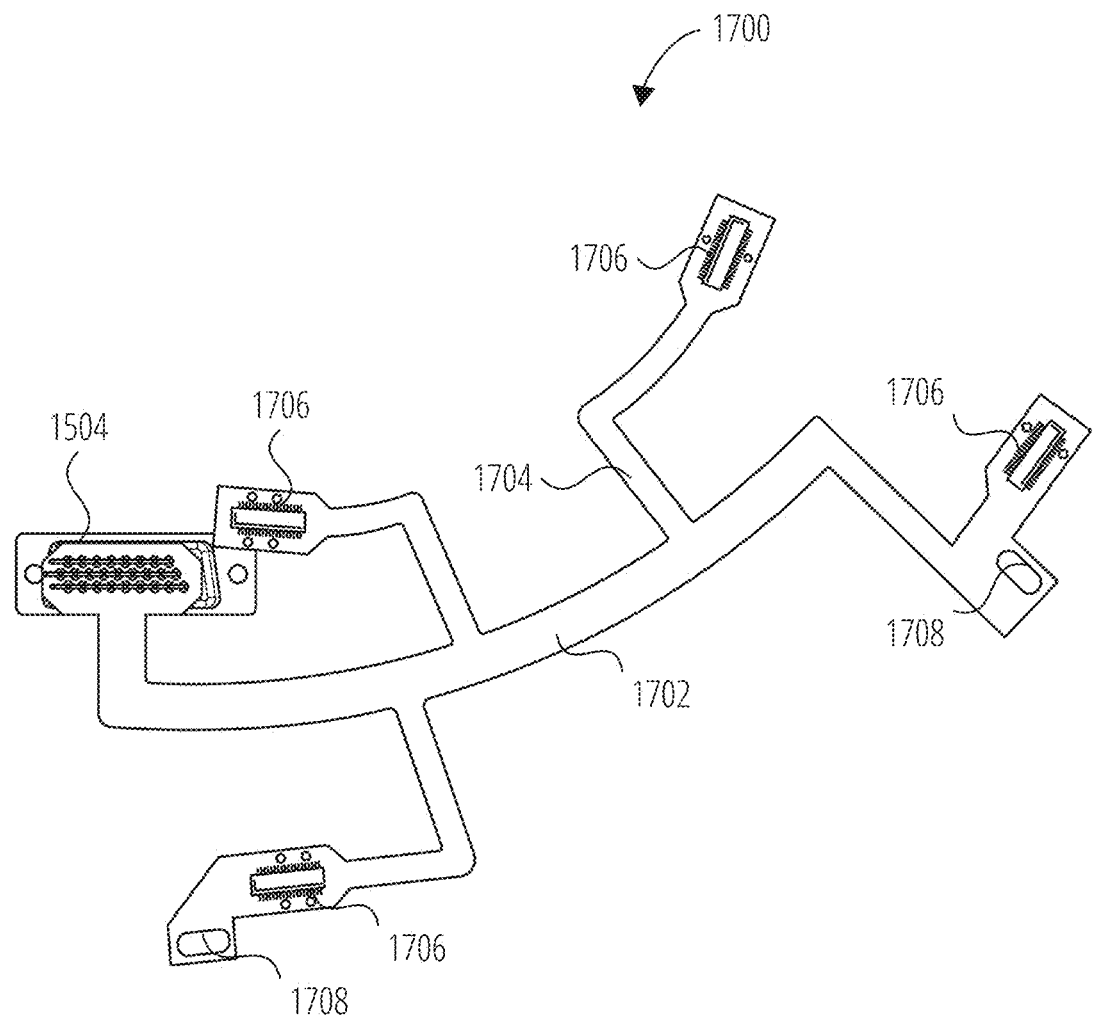
FIG. 17 is a flex PC for use in the light source of FIG. 15, according to some examples.

FIG. 17 is a flex PC 1700 for use in the light source 1500 of FIG. 15, according to some examples. The flex PC 1700 includes a central portion 1702 and branches 1704 that couple the external connector 1504 to several connectors 1706 for making electrical contact with the connectors 1608 of the metal-based PCBs in the light source 1500. Also provided are mounting holes 1708 for mounting the flex PC 1700 to the inner surface of the main body 1502. In some examples, the flex PC 1700 comprises electrical conductors comprising copper traces, encased in plastic, although other materials and forms of connecting cables can be used.

Figure 18:
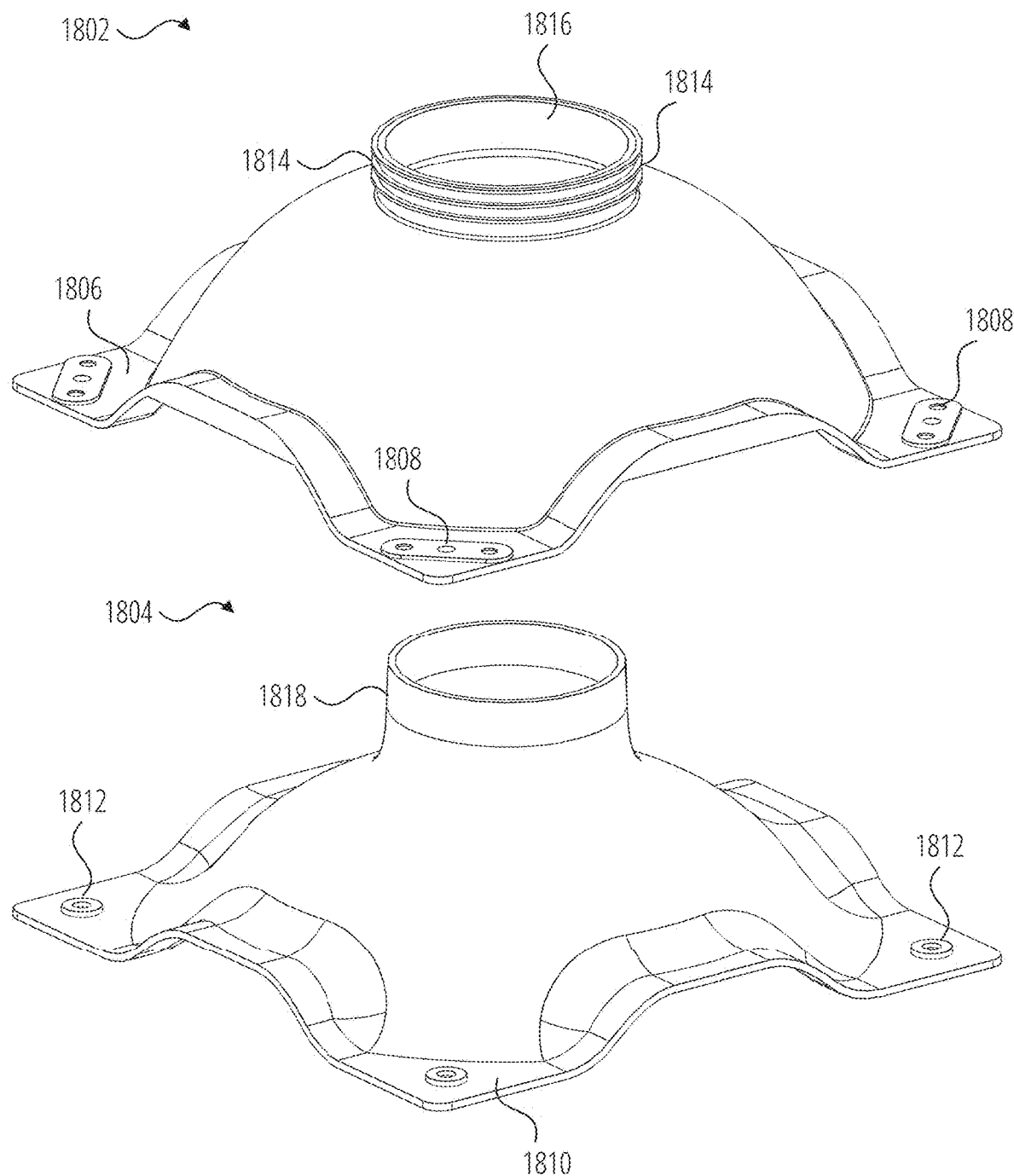
FIG. 18 is a perspective view of a clear diffuser and a translucent diffuser for use with the light source of FIG. 15, according to some examples.

FIG. 18 is a perspective view of a clear diffuser 1802 and a translucent diffuser 1804, according to some examples. As can be seen, the clear diffuser 1802 includes grooves 1814 formed in an upper tubular portion 1816 thereof, into which the O-rings are received. A flange 1806 has mounting holes 1808 formed therein for mounting the clear diffuser 1802 to the main body 1502.

The translucent diffuser 1804 includes an upper tubular portion 1818 that is received inside an upper tubular portion 1816 of the clear diffuser 1802. A flange 1810 has mounting holes 1812 formed therein for mounting the translucent diffuser 1804 to the main body 1502 as described above.

Various examples are contemplated. Example 1 is a feature inspection lighting system, comprising: a body including an inner surface, the inner surface having facets being defined therein; a PCB substrate formed of a ductile material, the PCB substrate comprising segments corresponding to the facets of the inner surface of the body, the PCB substrate being mounted to the inner surface of the body; and light emitters mounted to the PCB substrate.

In Example 2, the subject matter of Example 1 includes, a flexible cable including electrical conductors for making an electrical connection to the PCB substrate and having holes defined therein corresponding to at least some of the light emitters mounted to the PCB substrate, the flexible cable overlaying at least some of the PCB substrate with at least some of the light emitters being located in the holes defined in the flexible cable.

In Example 3, the subject matter of Examples 1-2 includes, wherein the body includes a first end having an aperture formed therein and a second end having an outer periphery, the feature inspection lighting system further comprising a light diffuser with a first end thereof located at the aperture of the body and a second end thereof located at the outer periphery of the body, the light diffuser being sealed to a surface of the aperture by at least one O-ring and being sealed to the outer periphery by a gasket.

In Example 4, the subject matter of Examples 2-3 includes, wherein the body includes a first end having an aperture formed therein and a second end having an outer periphery, the feature inspection lighting system further comprising a light diffuser with a first end thereof located at the aperture of the body and a second end thereof located at the outer periphery of the body, the light diffuser being sealed to a surface of the aperture by at least one O-ring and being sealed to the outer periphery by a gasket.

In Example 5, the subject matter of Examples 1-4 includes, wherein the ductile material is aluminum.

In Example 6, the subject matter of Examples 2-5 includes, wherein the ductile material is aluminum.

In Example 7, the subject matter of Examples 2-6 includes, wherein the flexible cable comprises a flexible printed circuit.

In Example 8, the subject matter of Example 7 includes, wherein the flexible printed circuit comprises copper traces encased in plastic.

In Example 9, the subject matter of Examples 3-8 includes a removable diffuser coupled to the body.

In Example 10, the subject matter of Examples 1-9 includes, wherein a thermal interface material is located between the PCB substrate and the inner surface of the body to facilitate heat transfer between the PCB substrate and the body.

In Example 11, the subject matter of Examples 1-10 includes, wherein the body is formed of metal and a thermal interface material is provided between the facets of the body and the segments of the PCB substrate.

In Example 12, the subject matter of Example 11 includes, wherein the body further comprises fins located on an exterior surface thereof.

Example 13 is a feature inspection lighting system, comprising: a main body having a mounting structure at a first end thereof and defining an outer periphery at a second end thereof, the main body including an inner surface having facets defined therein between the first end and the second end; a PCB substrate formed of a ductile material, the PCB substrate comprising segments corresponding to the facets of the inner surface of the main body, the PCB substrate being mounted to the inner surface of the main body; and light emitters mounted to the PCB substrate.

In Example 14, the subject matter of Example 13 includes, a light diffuser with a first end thereof located adjacent to the mounting structure at the first end of the body and a second end thereof located at the outer periphery of the body, the light diffuser being sealed to the first end of the body by at least one O-ring and being sealed to the outer periphery by a gasket.

In Example 15, the subject matter of Examples 13-14 includes, wherein a thermal interface material is located between the PCB substrate and the inner surface of the body to facilitate heat transfer between the PCB substrate and the body.

In Example 16, the subject matter of Examples 13-15 includes, wherein the ductile material is a metal.

In Example 17, the subject matter of Example 16 includes, wherein the metal is aluminum.

In Example 18, the subject matter of Examples 16-17 includes, wherein a thermal interface material is located between the PCB substrate and the inner surface of the body to facilitate heat transfer between the PCB substrate and the body.

In Example 19, the subject matter of Examples 16-18 includes, wherein the segments have lines marked between them to facilitate bending of the PCB substrate into the segments.

In Example 20, the subject matter of Examples 16-19 includes, wherein the segments have slots defined between them to facilitate bending of the PCB substrate into the segments.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20. Example 23 is a system to implement of any of Examples 1-20. Example 24 is a method to implement of any of Examples 1-20.

The invention claimed is:

1. A feature inspection lighting system, comprising:
   a body including an inner surface, the inner surface having flat facets defined therein;
   a PCB substrate formed of a ductile material, the PCB substrate comprising segments corresponding to the facets of the inner surface of the body, the PCB substrate being mounted to the inner surface of the body with the segments of the PCB substrate being located against corresponding facets of the inner surface; and
   light emitters mounted to the PCB substrate.

2. The feature inspection lighting system of claim 1, further comprising a flexible cable including electrical conductors for making an electrical connection to the PCB substrate and having holes defined therein corresponding to at least some of the light emitters mounted to the PCB substrate, the flexible cable overlaying at least some of the PCB substrate with at least some of the light emitters being located in the holes defined in the flexible cable.

3. The feature inspection lighting system of claim 1, wherein the body includes a first end having an aperture formed therein and a second end having an outer periphery, the feature inspection lighting system further comprising a light diffuser with a first end thereof located at the aperture of the body and a second end thereof located at the outer periphery of the body, the light diffuser being sealed to a surface of the aperture by at least one O-ring and being sealed to the outer periphery by a gasket.

4. The feature inspection lighting system of claim 2, wherein the body includes a first end having an aperture formed therein and a second end having an outer periphery, the feature inspection lighting system further comprising a light diffuser with a first end thereof located at the aperture of the body and a second end thereof located at the outer periphery of the body, the light diffuser being sealed to a surface of the aperture by at least one O-ring and being sealed to the outer periphery by a gasket.

5. The feature inspection lighting system of claim 1, wherein the ductile material is aluminum.

6. The feature inspection lighting system of claim 2, wherein the ductile material is aluminum.

7. The feature inspection lighting system of claim 2, wherein the flexible cable comprises a flexible printed circuit.

8. The feature inspection lighting system of claim 7, wherein the flexible printed circuit comprises copper traces encased in plastic.

9. The feature inspection lighting system of claim 3, further comprising a removable diffuser coupled to the body.

10. The feature inspection lighting system of claim 1, wherein a thermal interface material is located between the PCB substrate and the inner surface of the body to facilitate heat transfer between the PCB substrate and the body.

11. The feature inspection lighting system of claim 1, wherein the body is formed of metal and a thermal interface material is provided between the facets of the body and the segments of the PCB substrate.

12. The feature inspection lighting system of claim 11 wherein the body further comprises fins located on an exterior surface thereof.

13. A feature inspection lighting system, comprising:
    a body having a mounting structure at a first end thereof and defining an outer periphery at a second end thereof, the body including an inner surface having flat facets defined therein between the first end and the second end;
    a PCB substrate formed of a ductile material, the PCB substrate comprising segments corresponding to the facets of the inner surface of the body, the PCB substrate being mounted to the inner surface of the body with the segments of the PCB substrate being located against corresponding facets of the inner surface; and
    light emitters mounted to the PCB substrate.

14. The feature inspection lighting system of claim 13 further comprising a light diffuser with a first end thereof located adjacent to the mounting structure at the first end of the body and a second end thereof located at the outer periphery of the body, the light diffuser being sealed to the first end of the body by at least one O-ring and being sealed to the outer periphery by a gasket.

15. The feature inspection lighting system of claim 13 wherein a thermal interface material is located between the PCB substrate and the inner surface of the body to facilitate heat transfer between the PCB substrate and the body.

16. The feature inspection lighting system of claim 13 wherein the ductile material is a metal.

17. The feature inspection lighting system of claim 16 wherein the metal is aluminum.

18. The feature inspection lighting system of claim 16 wherein a thermal interface material is located between the PCB substrate and the inner surface of the body to facilitate heat transfer between the PCB substrate and the body.

19. The feature inspection lighting system of claim 16 wherein the segments have lines marked between them to facilitate bending of the PCB substrate into the segments.

20. The feature inspection lighting system of claim 16 wherein the segments have slots defined between them to facilitate bending of the PCB substrate into the segments.

* * * * *